US008526131B2

(12) United States Patent
Annampedu et al.

(10) Patent No.: US 8,526,131 B2
(45) Date of Patent: Sep. 3, 2013

(54) SYSTEMS AND METHODS FOR SIGNAL POLARITY DETERMINATION

(75) Inventors: Viswanath Annampedu, Schnecksville, PA (US); Jeffrey P. Grundvig, Loveland, CO (US); Keith R. Bloss, Schnecksville, PA (US); Vishal Narielwala, Edina, MN (US)

(73) Assignee: LSI Corporation, San Jose, CA (US)

( * ) Notice: Subject to any disclaimer, the term of this patent is extended or adjusted under 35 U.S.C. 154(b) by 340 days.

(21) Appl. No.: 12/955,789

(22) Filed: Nov. 29, 2010

(65) Prior Publication Data

US 2012/0134042 A1 May 31, 2012

(51) Int. Cl.
*G11B 5/09* (2006.01)
(52) U.S. Cl.
USPC .............................. 360/39; 360/46
(58) Field of Classification Search
None
See application file for complete search history.

(56) References Cited

U.S. PATENT DOCUMENTS

| | | |
|---|---|---|
| 3,973,182 A | 8/1976 | Kataoka |
| 3,973,183 A | 8/1976 | Kataoka |
| 4,024,571 A | 5/1977 | Dischert et al. |
| 4,777,544 A | 10/1988 | Brown et al. |
| 5,130,866 A | 7/1992 | Klaassen et al. |
| 5,237,325 A | 8/1993 | Klein et al. |
| 5,278,703 A | 1/1994 | Rub et al. |
| 5,309,357 A | 5/1994 | Stark et al. |
| 5,341,249 A | 8/1994 | Abbott et al. |
| 5,377,058 A | 12/1994 | Good et al. |
| 5,521,948 A | 5/1996 | Takeuchi |
| 5,523,902 A | 6/1996 | Pederson |
| 5,594,341 A | 1/1997 | Majidi-Ahy et al. |
| 5,668,679 A | 9/1997 | Swearingen et al. |
| 5,696,639 A | 12/1997 | Spurbeck et al. |
| 5,781,129 A | 7/1998 | Schwartz et al. |
| 5,787,125 A | 7/1998 | Mittel |
| 5,798,885 A | 8/1998 | Saiki et al. |
| 5,835,295 A | 11/1998 | Behrens |
| 5,844,920 A | 12/1998 | Zook et al. |
| 5,852,524 A | 12/1998 | Glover et al. |
| 5,892,632 A | 4/1999 | Behrens et al. |
| 5,955,783 A | 9/1999 | Ben-Efraim |

(Continued)

FOREIGN PATENT DOCUMENTS

| | | |
|---|---|---|
| FR | 2904168 A1 | 1/2008 |
| WO | WO 03/047091 | 6/2003 |
| WO | WO 2008/009620 | 1/2008 |

OTHER PUBLICATIONS

U.S. Appl. No. 12/663,319, filed Dec. 7, 2009, Ratnakar Aravind.

(Continued)

*Primary Examiner* — Regina N Holder
(74) *Attorney, Agent, or Firm* — Hamilton DeSanctis & Cha (57) ABSTRACT

Various embodiments of the present invention provide systems and methods for determining head polarity. As an example, a head polarity detection circuit includes: a first computation circuit, a second computation circuit, and an inversion determination circuit. The first computation circuit is operable to sum an absolute value of each sample of a first subset of a series of data samples corresponding to a first phase of an analog input to yield a first sum, and the second computation circuit is operable to sum an absolute value of each sample of a second subset of the series of data samples corresponding to a second phase of the analog input to yield a second sum. The first phase is more than ninety degrees offset from the second phase.

21 Claims, 7 Drawing Sheets

(56) References Cited

U.S. PATENT DOCUMENTS

| | | | |
|---|---|---|---|
| 5,970,104 A | 10/1999 | Zhong et al. | |
| 5,986,830 A | 11/1999 | Hein | |
| 5,987,562 A | 11/1999 | Glover | |
| 6,009,549 A | 12/1999 | Bliss et al. | |
| 6,023,383 A | 2/2000 | Glover et al. | |
| 6,069,583 A | 5/2000 | Silvestrin et al. | |
| 6,081,397 A | 6/2000 | Belser | |
| 6,111,712 A | 8/2000 | Vishakhadatta et al. | |
| 6,208,478 B1 | 3/2001 | Chiu et al. | |
| 6,278,591 B1 | 8/2001 | Chang | |
| 6,400,518 B1 | 6/2002 | Bhaumik et al. | |
| 6,404,829 B1 | 6/2002 | Sonu | |
| 6,411,452 B1 | 6/2002 | Cloke | |
| 6,441,661 B1 | 8/2002 | Aoki et al. | |
| 6,490,110 B2 | 12/2002 | Reed et al. | |
| 6,493,162 B1 | 12/2002 | Fredrickson | |
| 6,519,102 B1 | 2/2003 | Smith | |
| 6,530,060 B1 | 3/2003 | Vis et al. | |
| 6,603,622 B1 | 8/2003 | Christiansen et al. | |
| 6,606,048 B1 | 8/2003 | Sutardja | |
| 6,633,447 B2 | 10/2003 | Franck et al. | |
| 6,646,822 B1 | 11/2003 | Tuttle et al. | |
| 6,657,802 B1 | 12/2003 | Ashley et al. | |
| 6,775,529 B1 | 8/2004 | Roo | |
| 6,788,484 B2 | 9/2004 | Honma | |
| 6,813,108 B2 | 11/2004 | Annampedu et al. | |
| 6,816,328 B2 | 11/2004 | Rae | |
| 6,839,014 B2 | 1/2005 | Uda | |
| 6,856,183 B2 | 2/2005 | Annampedu | |
| 6,876,511 B2 | 4/2005 | Koyanagi | |
| 6,912,099 B2 | 6/2005 | Annampedu et al. | |
| 6,963,521 B2 | 11/2005 | Hayashi | |
| 6,999,257 B2 | 2/2006 | Takeo | |
| 6,999,264 B2 | 2/2006 | Ehrlich | |
| 7,002,761 B1 | 2/2006 | Sutardja et al. | |
| 7,002,767 B2 | 2/2006 | Annampedu et al. | |
| 7,038,875 B2 | 5/2006 | Lou et al. | |
| 7,054,088 B2 | 5/2006 | Yamazaki et al. | |
| 7,072,137 B2 | 7/2006 | Chiba | |
| 7,082,005 B2 | 7/2006 | Annampedu et al. | |
| 7,092,462 B2 | 8/2006 | Annampedu et al. | |
| 7,116,504 B1 | 10/2006 | Oberg | |
| 7,126,776 B1 | 10/2006 | Warren, Jr. et al. | |
| 7,136,250 B1 | 11/2006 | Wu et al. | |
| 7,154,689 B1 | 12/2006 | Shepherd et al. | |
| 7,167,328 B2 | 1/2007 | Annampedu et al. | |
| 7,180,693 B2 | 2/2007 | Annampedu et al. | |
| 7,187,739 B2 | 3/2007 | Ma | |
| 7,191,382 B2 | 3/2007 | James et al. | |
| 7,193,544 B1 | 3/2007 | Fitelson et al. | |
| 7,193,798 B2 | 3/2007 | Byrd et al. | |
| 7,199,961 B1 | 4/2007 | Wu et al. | |
| 7,203,013 B1 | 4/2007 | Han et al. | |
| 7,206,146 B2 | 4/2007 | Flynn et al. | |
| 7,230,789 B1 | 6/2007 | Brunnett et al. | |
| 7,248,425 B2 | 7/2007 | Byun et al. | |
| 7,253,984 B1 | 8/2007 | Patapoutian et al. | |
| 7,265,937 B1 | 9/2007 | Erden et al. | |
| 7,301,717 B1 | 11/2007 | Lee et al. | |
| 7,308,057 B1 | 12/2007 | Patapoutian | |
| 7,323,916 B1 | 1/2008 | Sidiropoulos et al. | |
| 7,362,536 B1 | 4/2008 | Liu et al. | |
| 7,375,918 B1 | 5/2008 | Shepherd et al. | |
| 7,411,531 B2 | 8/2008 | Aziz et al. | |
| 7,420,498 B2 | 9/2008 | Barrenscheen | |
| 7,423,827 B2 * | 9/2008 | Neville et al. | 360/51 |
| 7,446,690 B2 | 11/2008 | Kao | |
| 7,499,238 B2 | 3/2009 | Annampedu | |
| 7,525,460 B1 | 4/2009 | Liu et al. | |
| 7,602,568 B1 | 10/2009 | Katchmart | |
| 7,620,101 B1 | 11/2009 | Jenkins | |
| 7,630,155 B2 | 12/2009 | Maruyama et al. | |
| 7,760,454 B1 * | 7/2010 | Han et al. | 360/40 |
| 2002/0001151 A1 | 1/2002 | Lake | |
| 2002/0150179 A1 | 10/2002 | Leis et al. | |
| 2002/0176185 A1 | 11/2002 | Fayeulle et al. | |
| 2002/0181377 A1 | 12/2002 | Nagata et al. | |
| 2003/0095350 A1 | 5/2003 | Annampedu et al. | |
| 2004/0179460 A1 | 9/2004 | Furumiya et al. | |
| 2005/0046982 A1 | 3/2005 | Liu et al. | |
| 2005/0157415 A1 | 7/2005 | Chiang et al. | |
| 2005/0243455 A1 | 11/2005 | Annampedu | |
| 2007/0064847 A1 | 3/2007 | Gaedke et al. | |
| 2007/0071152 A1 | 3/2007 | Chen et al. | |
| 2007/0103805 A1 | 5/2007 | Hayashi et al. | |
| 2007/0104300 A1 | 5/2007 | Esumi et al. | |
| 2007/0183073 A1 | 8/2007 | Sutardja et al. | |
| 2007/0230015 A1 | 10/2007 | Yamashita et al. | |
| 2007/0263311 A1 | 11/2007 | Smith | |
| 2008/0056403 A1 | 3/2008 | Wilson | |
| 2008/0080082 A1 | 4/2008 | Erden et al. | |
| 2008/0212715 A1 | 9/2008 | Chang | |
| 2008/0266693 A1 | 10/2008 | Bliss et al. | |
| 2009/0002862 A1 | 1/2009 | Park | |
| 2009/0142620 A1 | 6/2009 | Yamamoto et al. | |
| 2009/0245448 A1 | 10/2009 | Ran et al. | |
| 2009/0274247 A1 | 11/2009 | Galbraith et al. | |

OTHER PUBLICATIONS

U.S. Appl. No. 12/851,475, filed Aug. 5, 2010, Annampedu, Viswanath.

U.S. Appl. No. 12/887,327, filed Sep. 21, 2010, Llu et al.

U.S. Appl. No. 12/894,221, filed Sep. 30, 2010, Yang et al.

U.S. Appl. No. 12/946,048, filed Nov. 15, 2010, Yang et al.

U.S. Appl. No. 12/947,962, filed Nov. 17, 2010, Liu et al.

U.S. Appl. No. 12/946,033, filed Nov. 15, 2010, Yang et al.

U.S. Appl. No. 12/955,821, filed Nov. 29, 2010, Annampedu et al.

Annampedu and Aziz, "Adaptive Algorithms for Asynchronous Detection of Coded Servo Signals Based on Interpolation", IEEE Transactions on Magnetics, vol. 41, No. 10, Oct. 20, 2005.

Aziz, Annampedu, "Interpolation Based Max.-Likelihood(ML) Detection Asynchronous Servo Repeatable Run Out Data", Digest, IEEE Int'l Mag. Conf. vol. 42 No. 10 pp. 2585-2587 Oct. 2006.

* cited by examiner

SYSTEMS AND METHODS FOR SIGNAL POLARITY DETERMINATION

BACKGROUND OF THE INVENTION

The present invention relates generally to accessing storage media, and more particularly without limitation to systems and methods compensating for head assembly polarity in relation to accessing storage media.

Various storage media are used to store information. In a typical implementation, data is written to and read from a disk using a read/write head assembly that is disposed near the surface of the disk. In an effort to increase the potential information storage density, the geometry of the head assemblies have been substantially reduced and materials used to form the head assemblies have changed. While these advancements have allowed for increased data storage, they have also resulted in various undesirable affects. For example, the polarity of head assemblies is known to invert. When the polarity of a head assembly inverts, the signal read back from the disk is inverted from the expected polarity. This results in an inability to read data from the disk.

Some solutions to this problem include providing a user selectable switch that allows a user to invert the head assembly when the user notices a number of read errors. This may be an effective solution where polarity inversion is very infrequent. However, this solution is not effective where inversion of the head assembly happens more than once or twice in the lifetime of the head assembly. Another solution automatically switches the polarity of the head assembly after a period of failed reads is detected. After the period of failed reads, the polarity of the head assembly is inverted. While this solution is automatic, it can have a devastating impact on the rate at which data from a disk can be read. Further, this impact may be highly unpredictable where the frequency at which the head assembly is changing polarity is variable. Yet another solution replicates a substantial portion of the pattern detection circuit—using an original portion of the pattern detection circuit to operate on non-inverted data and the replicated portion to operate on inverted data. Where the original portion of the circuit identifies the pattern the head is considered to be non-inverted. In contrast, when the replicated portion identifies the pattern, the head is considered to be inverted. While effective, such an approach is expensive both in terms of semiconductor area and power consumption.

Hence, for at least the aforementioned reasons, there exists a need in the art for advanced systems and methods accessing data using a variable polarity head assembly.

BRIEF SUMMARY OF THE INVENTION

The present invention relates generally to accessing storage media, and more particularly without limitation to systems and methods compensating for head assembly polarity in relation to accessing storage media.

Various embodiments of the present invention provide methods for determining a signal polarity in a data processing systems. The methods include receiving a series of data samples corresponding to an analog input. A first subset of the data samples correspond to a first sample phase of the analog input and a second subset of the data samples correspond to a second sample phase of the analog input. The methods further include: performing a defined pattern detection on the first subset of the data samples where the defined pattern is identified in the first subset of the data samples; summing an absolute value of each sample of the first subset of the data samples to yield a first sum; performing the defined pattern detection on the second subset of the data samples; and summing an absolute value of each sample of the second subset of the data samples to yield a second sum. A signal polarity is determined based at least in part on a difference between the first sum and the second sum. In some cases, the first sample phase is approximately one hundred eighty degrees away from the second sample phase. In one or more cases, the defined pattern is a sector address mark pattern In some instances of the aforementioned embodiments, the first subset of the data samples are inverted data samples. In such instances, determining a head polarity at least in part on a difference between the first sum and the second sum includes: comparing the first sum with the second sum indicating that the first sum is greater than the second sum; and indicating an inverted head polarity based at least in part on the identified defined pattern and the first sum being greater than the second sum.

In other instances of the aforementioned embodiments, the first subset of the data samples are non-inverted data samples. In such instances, determining a head polarity at least in part on a difference between the first sum and the second sum includes: comparing the first sum with the second sum indicating that the first sum is greater than the second sum; and indicating a non-inverted head polarity based at least in part on the identified defined pattern and the first sum being greater than the second sum.

In various instances of the aforementioned embodiments, performing the defined pattern detection on the first subset of the data samples includes: resolving the first subset of the digital samples to binary bit values; and comparing the binary bit values to the defined pattern. In some cases, resolving the first subset of the digital samples to binary bit values includes: setting a binary bit value to a +1 when the corresponding digital sample is greater than zero; and setting a binary bit value to a −1 when the corresponding digital sample is less than zero.

In some cases, determining the head polarity at least in part on a difference between the first sum and the second sum includes: comparing the first sum with the second sum where the first sum is less than the second sum; and maintaining a previous head polarity. In other cases, performing the defined pattern detection on the second subset of the data samples results in identification of the defined pattern in the second subset of the data samples. In such cases, the methods further include maintaining a previous head polarity.

Other embodiments of the present invention provide head polarity detection circuits. The circuits include: a first computation circuit, a second computation circuit, and an inversion determination circuit. The first computation circuit is operable to sum an absolute value of each sample of a first subset of a series of data samples corresponding to a first phase of an analog input to yield a first sum, and the second computation circuit is operable to sum an absolute value of each sample of a second subset of the series of data samples corresponding to a second phase of the analog input to yield a second sum. The first phase is more than ninety degrees offset from the second phase. The inversion determination circuit is operable to determine a head polarity based at least in part on a difference between the first sum and the second sum. In some cases, the defined pattern is a sector address mark pattern. In some instances, the circuit is implemented as part of an integrated circuit and/or the circuit is implemented as part of a storage device.

In some instances of the aforementioned embodiments, the circuit further includes a sample buffer circuit operable to maintain the first subset of the data samples and the second subset of the data samples. In one or more instances of the aforementioned embodiments, the circuit further includes: a first pattern detection circuit operable to perform a defined pattern detection on the first subset of the data samples, and a second pattern detection circuit operable to perform the defined pattern detection on the second subset of the data samples. The defined pattern is identified in the first subset of the data samples.

Yet other embodiments of the present invention provide storage devices. Such storage devices include: a storage medium, a head assembly, and a head polarity determination circuit. The head assembly is disposed in relation to the storage medium and is operable to generate an analog input corresponding to information on the storage medium. The head polarity determination circuit includes a first computation circuit, a second computation circuit, a first pattern detection circuit, a second pattern detection circuit, and an inversion determination circuit. The first computation circuit is operable to sum an absolute value of each sample of a first subset of a series of data samples corresponding to a first phase of the analog input to yield a first sum. The second computation circuit is operable to sum an absolute value of each sample of a second subset of the series of data samples corresponding to a second phase of the analog input to yield a second sum. The first pattern detection circuit is operable to perform a defined pattern detection on the first subset of the data samples that identifies the defined pattern in the first subset of the data samples. The second pattern detection circuit is operable to perform the defined pattern detection on the second subset of the data samples. The inversion determination circuit operable to determine a polarity of the head assembly based at least in part on a difference between the first sum and the second sum. The first phase is more than ninety degrees offset from the second phase.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention relates generally to accessing storage media, and more particularly without limitation to systems and methods compensating for head assembly polarity in relation to accessing storage media.

Figure 1:
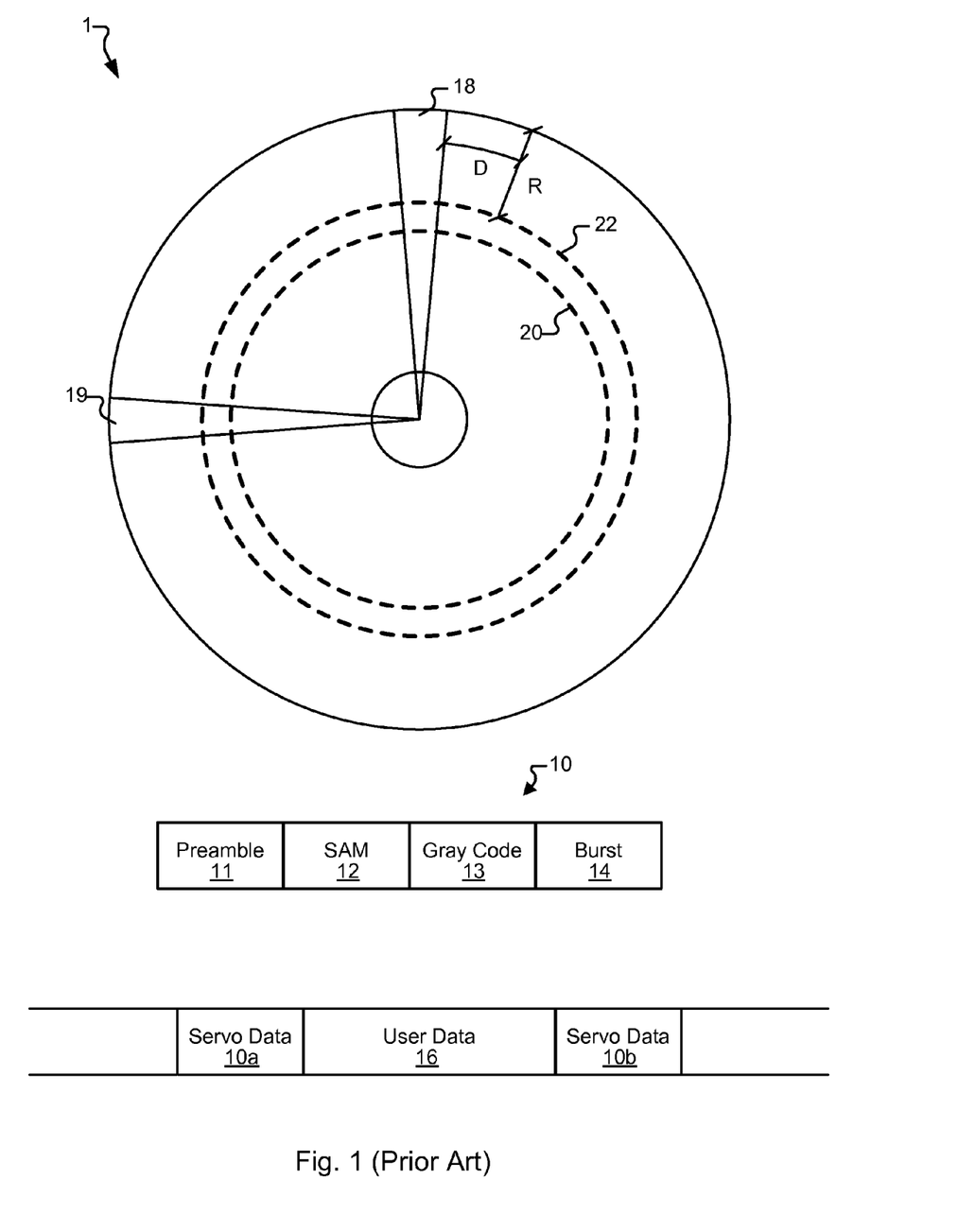
FIG. 1 is a block diagram of a known magnetic storage medium and sector data scheme.

Turning to FIG. 1, a storage medium 1 is shown with two exemplary tracks 20, 22 indicated as dashed lines. The tracks are segregated by servo data written within wedges 19, 18. These wedges include servo data 10 that are used for control and synchronization of a read/write head assembly over a desired location on storage medium 1. In particular, this servo data generally includes a preamble pattern 11 followed by a sector address mark 12 (SAM). Sector address mark 12 is followed by a Gray code 13, and Gray code 13 is followed by burst information 14. It should be noted that while two tracks and two wedges are shown, hundreds of each would typically be included on a given storage medium. Further, it should be noted that a servo data set may have two or more fields of burst information. Yet further, it should be noted that different information may be included in the servo fields such as, for example, repeatable run-out information that may appear after burst information 14. Between the servo data bit patterns 10a and 10b, a user data region 16 is provided.

In operation, storage medium 1 is rotated in relation to a sensor that senses information from the storage medium. In a read operation, the sensor would sense servo data from wedge 19 (i.e., during a servo data period) followed by user data from a user data region between wedge 19 and wedge 18 (i.e., during a user data period) and then servo data from wedge 18. In a write operation, the sensor would sense servo data from wedge 19 then write data to the user data region between wedge 19 and wedge 18. Then, the sensor would be switched to sense a remaining portion of the user data region followed by the servo data from wedge 18.

Figure 2:
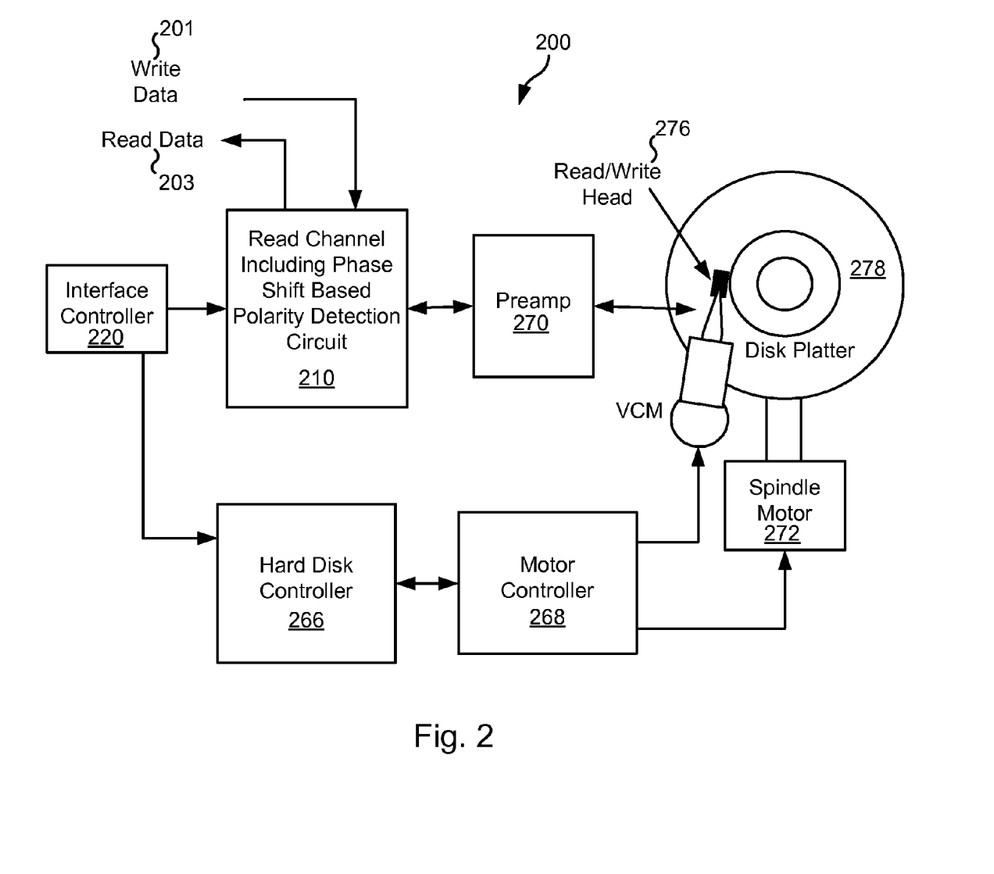
FIG. 2 shows a storage system including a read channel circuit with a phase shift based polarity detection circuit in accordance with some embodiments of the present invention.

Turning to FIG. 2, a storage system 200 including a read channel circuit 210 with a phase shift based polarity detection circuit is shown in accordance with some embodiments of the present invention. Storage system 200 may be, for example, a hard disk drive. Storage system 200 also includes a preamplifier 270, an interface controller 220, a hard disk controller 266, a motor controller 268, a spindle motor 272, a disk platter 278, and a read/write head 276. Interface controller 220 controls addressing and timing of data to/from disk platter 278. The data on disk platter 278 consists of groups of magnetic signals that may be detected by read/write head assembly 276 when the assembly is properly positioned over disk platter 278. In one embodiment, disk platter 278 includes magnetic signals recorded in accordance with either a longitudinal or a perpendicular recording scheme.

In a typical read operation, read/write head assembly 276 is accurately positioned by motor controller 268 over a desired data track on disk platter 278. Motor controller 268 both positions read/write head assembly 276 in relation to disk platter 278 and drives spindle motor 272 by moving read/write head assembly to the proper data track on disk platter 278 under the direction of hard disk controller 266. Spindle motor 272 spins disk platter 278 at a determined spin rate (RPMs). Once read/write head assembly 278 is positioned adjacent the proper data track, magnetic signals representing data on disk platter 278 are sensed by read/write head assembly 276 as disk platter 278 is rotated by spindle motor 272. The sensed magnetic signals are provided as a continuous, minute analog signal representative of the magnetic data on disk platter 278. This minute analog signal is transferred from read/write head assembly 276 to read channel module 264 via preamplifier 270. Preamplifier 270 is operable to amplify the minute analog signals accessed from disk platter 278. In turn, read channel circuit 210 decodes and digitizes the received analog signal to recreate the information originally written to disk platter 278. This data is provided as read data 203 to a receiving circuit. As part of decoding the received information, read channel circuit 210 performs a data polarity check process that identifies the polarity of read/write head assembly 276. Such a data polarity check process may be performed using, for example, the circuit described above in relation to FIG. 3 below, and/or the method discussed above in relation to FIGS. 6a-6b. A write operation is substantially the opposite of the preceding read operation with write data 201 being provided to read channel circuit 210. This data is then encoded and written to disk platter 278.

It should be noted that storage system 200 may be integrated into a larger storage system such as, for example, a RAID (redundant array of inexpensive disks or redundant array of independent disks) based storage system. It should also be noted that various functions or blocks of storage system 200 may be implemented in either software or firmware, while other functions or blocks are implemented in hardware.

Figure 3:
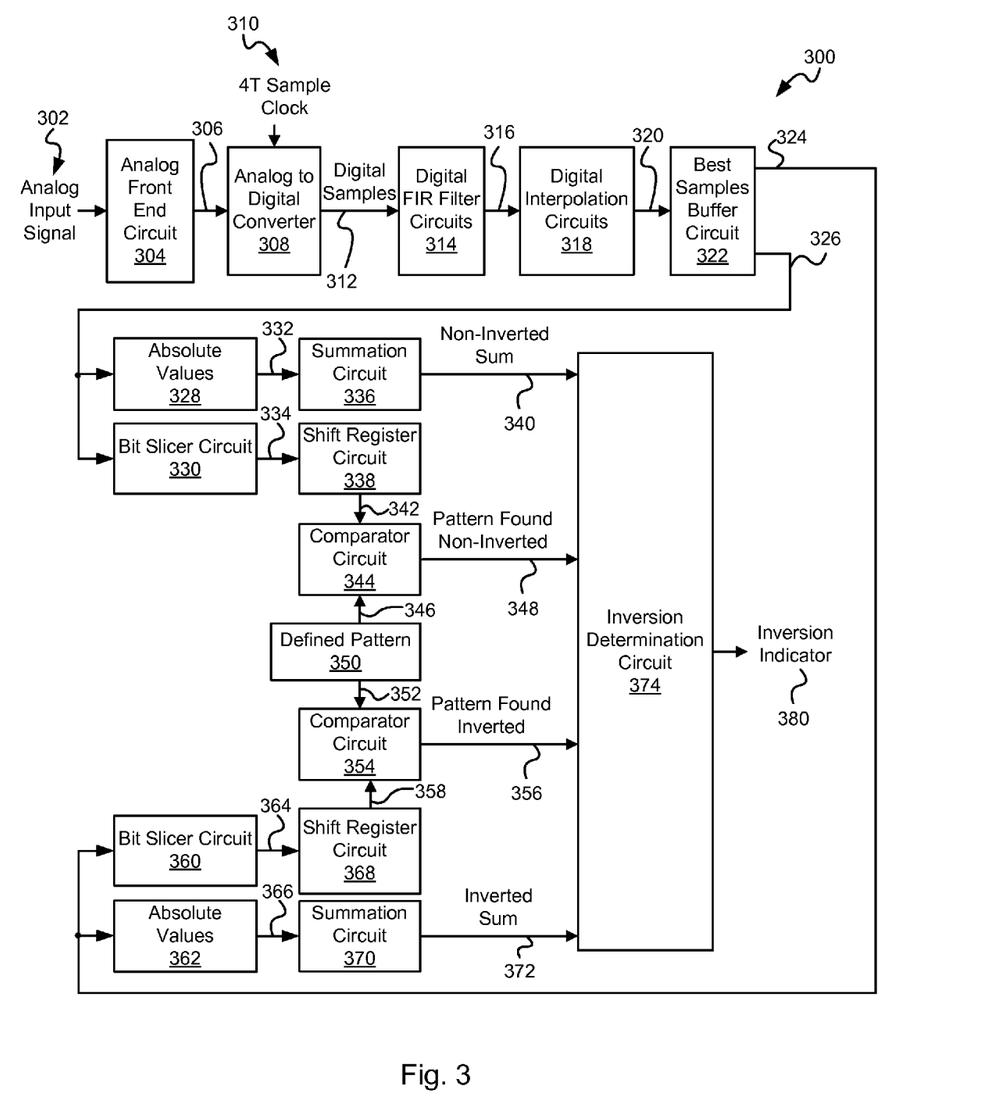
FIG. 3 depicts a phase shift based polarity detection circuit in accordance with one or more embodiments of the present invention.

Turning to FIG. 3, a phase shift based polarity detection circuit 300 is shown in accordance with one or more embodiments of the present invention. Phase shift based polarity detection circuit 300 includes an analog front end circuit 304 that receives an analog input signal 302 and provides a corresponding analog signal 306. Analog front end circuit 304 may include any circuitry known in the art that is capable of receiving an analog input signal and providing a modified analog signal. In one particular instance, analog front end circuit 304 includes an amplifier that receives and amplifies analog input signal 302, an analog filter that reduces any noise exhibited at the output of the amplifier, and an analog to digital converter that receives the filtered signal and provides a series of digital samples corresponding to the magnitude of the filtered signal at defined sampling points. Based upon the disclosure provided herein, one of ordinary skill in the art will recognize a variety of circuitry that may be included in analog front end circuit 304 in accordance with different embodiments of the present invention.

Analog signal 306 is provided to an analog to digital converter circuit 308. Analog to digital converter circuit 308 provides a series of digital samples 312 representing analog signal 306. Digital samples 312 are synchronized to a 4T sample clock 310. Analog to digital converter circuit 308 may be any circuit or system known in the art that is capable of converting a continuous signal into a series of digital samples. Analog input signal 306 is a continuous signal representing a number of bit periods. The bit periods recur with a periodicity of T, and the 4T sample clock causes analog to digital converter circuit 308 to generate four samples of analog input signal 302 for each period T. It should be noted that while the present embodiment is described as utilizing four samples per period, other embodiments of the present invention may use a lower sampling frequency such as, for example, a 3T clock, or may use a higher sampling frequency such as, for example, an 8T clock or 16T clock. Based upon the disclosure provided herein, one of ordinary skill in the art will recognize a variety of sampling frequencies and corresponding bit periods that may be used in relation to different embodiments of the present invention. Analog input signal 302 may be derived from a variety of sources. For example, analog input signal 302 may be received from a read/write head assembly (not shown) disposed in relation to a storage medium (not shown). As another example, analog input signal 302 may be derived from a receiver circuit (not shown) that is receiving a wireless transmission. Based upon the disclosure provided herein, one of ordinary skill in the art will recognize a variety of other sources of analog input signal 302.

Digital samples 312 are provided to a bank of digital finite impulse response (FIR) filter circuits 314 that filters the received input and provides corresponding filtered outputs 316. The digital filter circuits 314 may be implemented using any digital filtering architecture or approach known in the art. Filtered outputs 316 are provided to a bank of digital interpolation circuits 318. In one particular embodiment of the present invention, seven digital interpolation circuits 318 are used such that eight phases of the selected filtered outputs 316 are provided as an interpolated output 320 to a best samples buffer circuit 322. Best samples buffer circuit 322 thus maintains at least samples corresponding to 0T, 4T, 8T . . . sample points (referred to hereinafter as non-inverted samples 326), and samples corresponding to 2T, 6T, 10T . . . sample points (referred to hereinafter as inverted samples 324) that are approximately one hundred eighty degrees out of phase from the previously mentioned sample points. Of note, the values stored in best samples buffer circuit 322 are the raw digital values that correspond to respectively to +1, 0, −1 values. It should be noted that a phase offset other than one hundred eighty degrees may be used. For example, in some embodiments of the present invention, the inverted samples lag the non-inverted samples by between ninety degrees and two hundred, seventy degrees. As another example, the inverted samples lead the non-inverted samples by between ninety degrees and two hundred, seventy degrees.

Figure 4A:
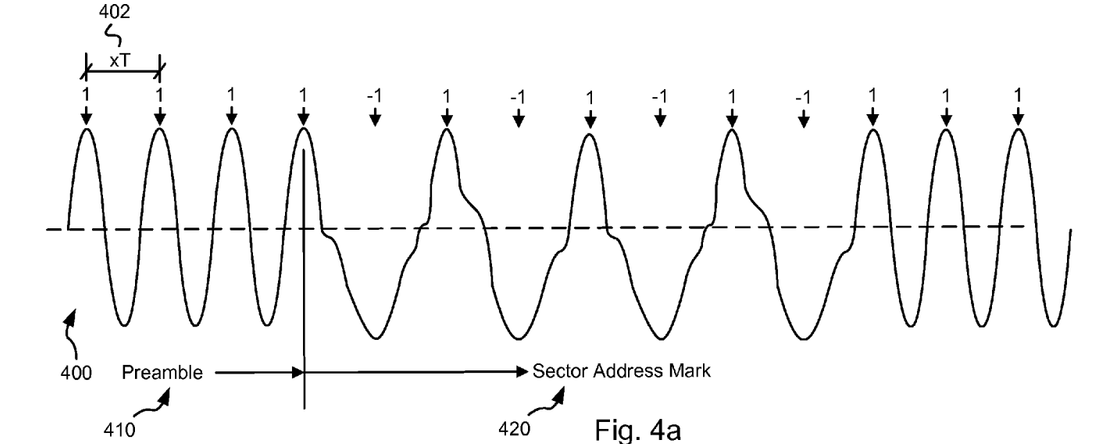
FIGS. 4a-4b depict exemplary data inputs and corresponding inverted inputs that may be processed in accordance with various embodiments of the present invention.
Figure 4B:
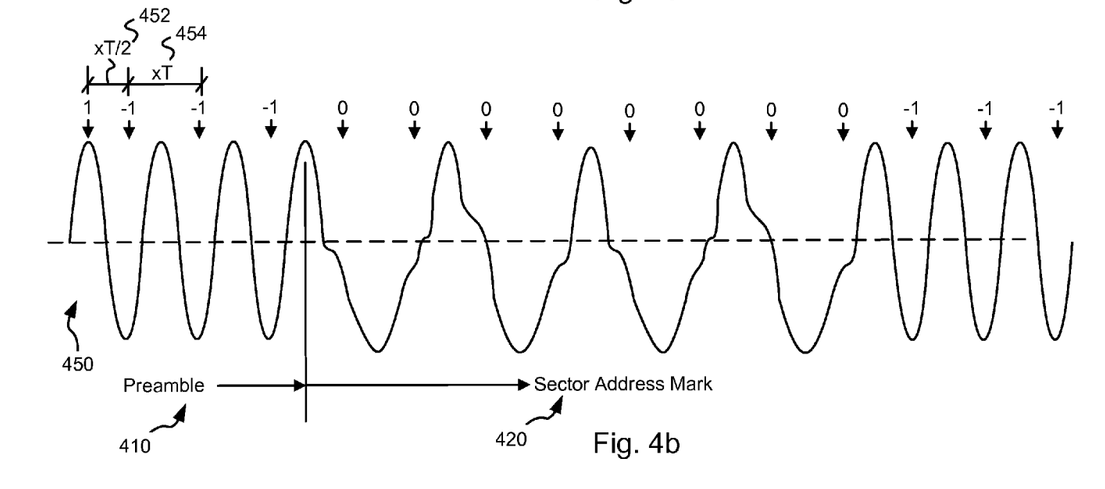
Figure 5A:
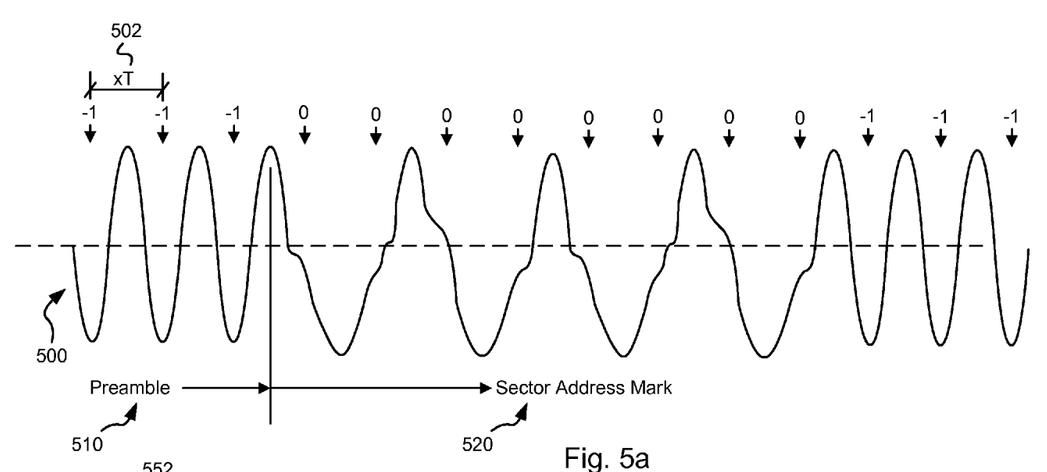
FIGS. 5a-5b depict exemplary data inputs and corresponding inverted inputs that may be processed in accordance with various embodiments of the present invention.
Figure 5B:
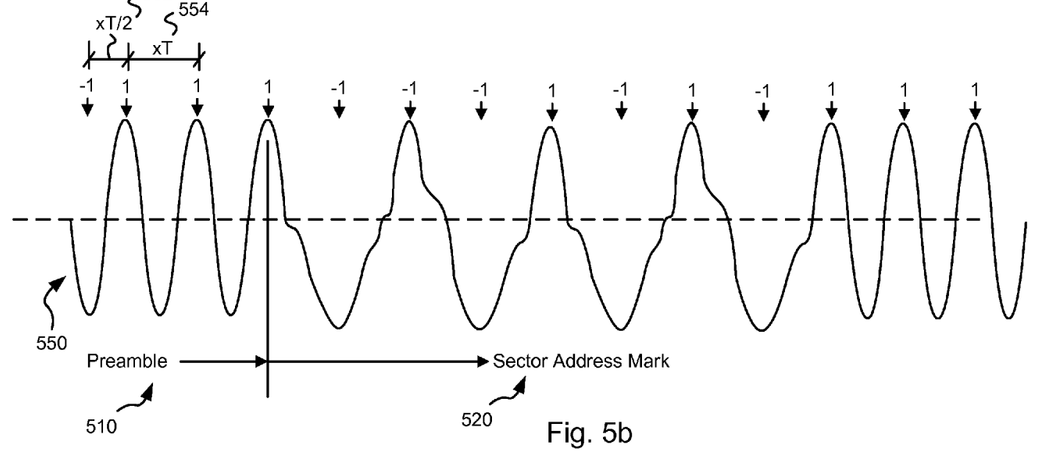

FIGS. 4 and 5 show examples of non-inverted samples 326 and inverted samples 324. In particular, FIGS. 4a and 4b show a non-inverted signal 400 from which non-inverted sample values (1, 1, 1, 1, −1, 1, −1, 1, −1, 1, −1, 1, 1, 1) corresponding to 0T, 4T, 8T . . . sample points, and an inverted signal 450 showing inverted sample values (−1, −1, −1, 0, 0, 0, 0, 0, 0, 0, 0, −1, −1, −1) corresponding to 2T, 6T, 10T . . . sample points. Of note, in the preceding series of samples, a 1 indicates a digital sample value greater than zero, a 0 indicates a digital sample value of approximately zero, and a −1 indicates a digital sample value less than zero. A first portion of non-inverted signal 400 corresponds to a preamble sequence 410, and a second portion of non-inverted signal 400 corresponds to a sector address mark sequence 420. The phase difference between each sample is xT 402 (e.g., 0T, 4T, 8T . . . ), where xT corresponds to approximately a three hundred sixty degree phase shift. A second portion of inverted signal 450 corresponds to a preamble sequence 410, and a second portion of inverted signal 450 corresponds to a sector address mark sequence 420. The phase difference between each sample is xT 454, and each sample is offset from the corresponding sample in non-inverted signal 400 is xT/2 452 (2T, 6T, 10T . . . ). In some cases, the value of xT/2 corresponds to approximately a one hundred eighty degree phase shift. In various cases, the value of xT/2 corresponds to a phase shift of between ninety and two hundred, seventy degrees. In this case, both non-inverted signal 400 and inverted signal 450 are received via a non-inverted head assembly (not shown).

FIGS. 5a and 5b show the reverse situation of FIGS. 4a and 4b where both a non-inverted signal 500 and an inverted signal 550 are received via an inverted head assembly. Sample values (−1, −1, −1, 0, 0, 0, 0, 0, 0, 0, 0, −1, −1, −1) corresponding to 0T, 4T, 8T . . . sample points are shown in relation to non-inverted signal 500. Sample values (1, 1, 1, 1, −1, 1, −1, 1, −1, 1, −1, 1, 1, 1) corresponding to 2T, 6T, 10T ... sample points are shown in relation to inverted signal 550. A first portion of non-inverted signal 500 corresponds to a preamble sequence 510, and a second portion of non-inverted signal 500 corresponds to a sector address mark sequence 520. The phase difference between each sample is xT 502 (e.g., 0T, 4T, 8T ... ). A first portion of inverted signal 550 corresponds to preamble sequence 510, and a second portion of inverted signal 550 corresponds to sector address mark sequence 520. The phase difference between each sample is xT 554, and each sample is offset from the corresponding sample in non-inverted signal 400 is xT/2 552 (2T, 6T, 10T ... ).

Referring back to FIG. 3, non-inverted samples 326 are provided to an absolute value circuit 328 and to a bit slicer circuit 330. Absolute value circuit 328 provides the raw values received as non-inverted samples 326 to an absolute value output 332 as a positive value in accordance with the following equation:

Absolute Value Output 332=|Non-Inverted Sample 326|.

Bit slicer circuit 330 resolves the raw digital values from best samples buffer circuit 322 to values +1, 0, −1 values. In one embodiment, a raw value provided as non-inverted samples 326 that is greater than zero is provided to a resolved output 334 as a +1, a raw value provided as non-inverted samples 326 that is exactly zero is provided to a resolved output 334 as a 0, and a raw value provided as non-inverted samples 326 that is less than zero is provided to a resolved output 334 as a −1. In some cases, resolution is only to +1 and −1, where +1 corresponds to digital sample values greater than zero, and −1 corresponds to digital sample values less than or equal to zero. Alternatively, resolution may be to '1' for digital sample values greater than zero, and '0' for digital sample values less than or equal to zero.

Resolved output 334 is provided to a shift register circuit 338 operating as a first in, first out memory storing a defined number of bits. In one particular embodiment of the present invention, the defined number of bits corresponds to the number of bits in the sector address mark pattern. Bits 342 from shift register circuit 338 are provided to a comparator circuit 344. Comparator circuit 344 also receives bits 346 corresponding to a defined pattern 350. Defined pattern 350 is the expected sector address mark, and may be programmable or fixed depending upon the implementation of phase shift based polarity detection circuit 300. When bits 342 are equivalent to bits 346, comparator circuit 344 asserts a pattern found non-inverted signal 348 as an indication that the sequence corresponding to the sector address mark was found in the received data.

Absolute value output 332 is provided to a summation circuit 336 that provides a non-inverted sum output 340. Non-inverted sum output 340 is a running sum of the most recently received, defined number of samples. The defined number of samples is the same as the defined number of bits in shift register circuit 338. Non-inverted sum output 340 is calculated in accordance with the following equation:

$$\text{Non-Inverted Sum Output } 340 = \sum_{n=0}^{k-1} (\text{Absolute Value Output } 332)_n,$$

where n indicates a respective one of absolute value output 332, and k is the aforementioned defined number of samples received as absolute value output 332.

Inverted samples 324 are provided to an absolute value circuit 362 and to a bit slicer circuit 360. Absolute value circuit 362 provides the raw values received as inverted samples 324 to an absolute value output 364 as a positive value in accordance with the following equation:

Absolute Value Output 364=|Inverted Sample 324|.

Bit slicer circuit 360 resolves the raw digital values from best samples buffer circuit 322 to values +1, 0, −1 values. In one embodiment, a raw value provided as inverted samples 324 that is greater than zero is provided to a resolved output 366 as a +1, a raw value provided as inverted samples 324 that is exactly zero is provided to a resolved output 364 as a 0, and a raw value provided as non-inverted samples 324 that is less than zero is provided to a resolved output 364 as a −1. In some cases, resolution is only to +1 and −1, where +1 corresponds to digital sample values greater than zero, and −1 corresponds to digital sample values less than or equal to zero. Alternatively, resolution may be to '1' for digital sample values greater than zero, and '0' for digital sample values less than or equal to zero.

Resolved output 364 is provided to a shift register circuit 368 operating as a first in, first out memory storing a defined number of bits. In one particular embodiment of the present invention, the defined number of bits corresponds to the number of bits in the sector address mark pattern. Bits 358 from shift register circuit 368 are provided to a comparator circuit 354. Comparator circuit 354 also receives bits 352 corresponding to defined pattern 350. Again, defined pattern 350 is the expected sector address mark, and may be programmable or fixed depending upon the implementation of phase shift based polarity detection circuit 300. When bits 358 are equivalent to bits 352, comparator circuit 354 asserts a pattern found inverted signal 356 as an indication that the sequence corresponding to the sector address mark was found in the received data.

Absolute value output 366 is provided to a summation circuit 370 that provides an inverted sum output 372. Inverted sum output 372 is a running sum of the most recently received, defined number of samples. The defined number of samples is the same as the defined number of bits in shift register circuit 368. Inverted sum output 372 is calculated in accordance with the following equation:

$$\text{Inverted Sum Output } 372 = \sum_{n=0}^{k-1} (\text{Absolute Value Output } 366)_n,$$

where n indicates a respective one of absolute value output 366, and k is the aforementioned defined number of samples received as absolute value output 366.

An inversion determination circuit 374 receives inverted sum output 372, non-inverted sum output 340, pattern found non-inverted signal 348, and pattern found inverted signal 356. Based upon the aforementioned inputs, inversion determination circuit 374 determines whether the head assembly from which analog input signal 302 was received is inverted or non-inverted. Where the head assembly is inverted, inversion indicator circuit 380 is asserted high. Otherwise, inversion indicator circuit 380 is asserted low. In particular, the following pseudo-code represents the operation of inversion indicator circuit 380:

```
If (Pattern Found Inverted 356 is Asserted)
{
    If (Inverted Sum 372 > Non-Inverted Sum 340)
    {
        Inversion Indicator 380 is Asserted High
    }
}
Else
{
    Inversion Indicator 380 is Asserted Low
}
```

Inversion Indicator 380 may then be used to modify how the circuit operates to process data by either inverting the data input, or using the data input as is.

Figure 6A:
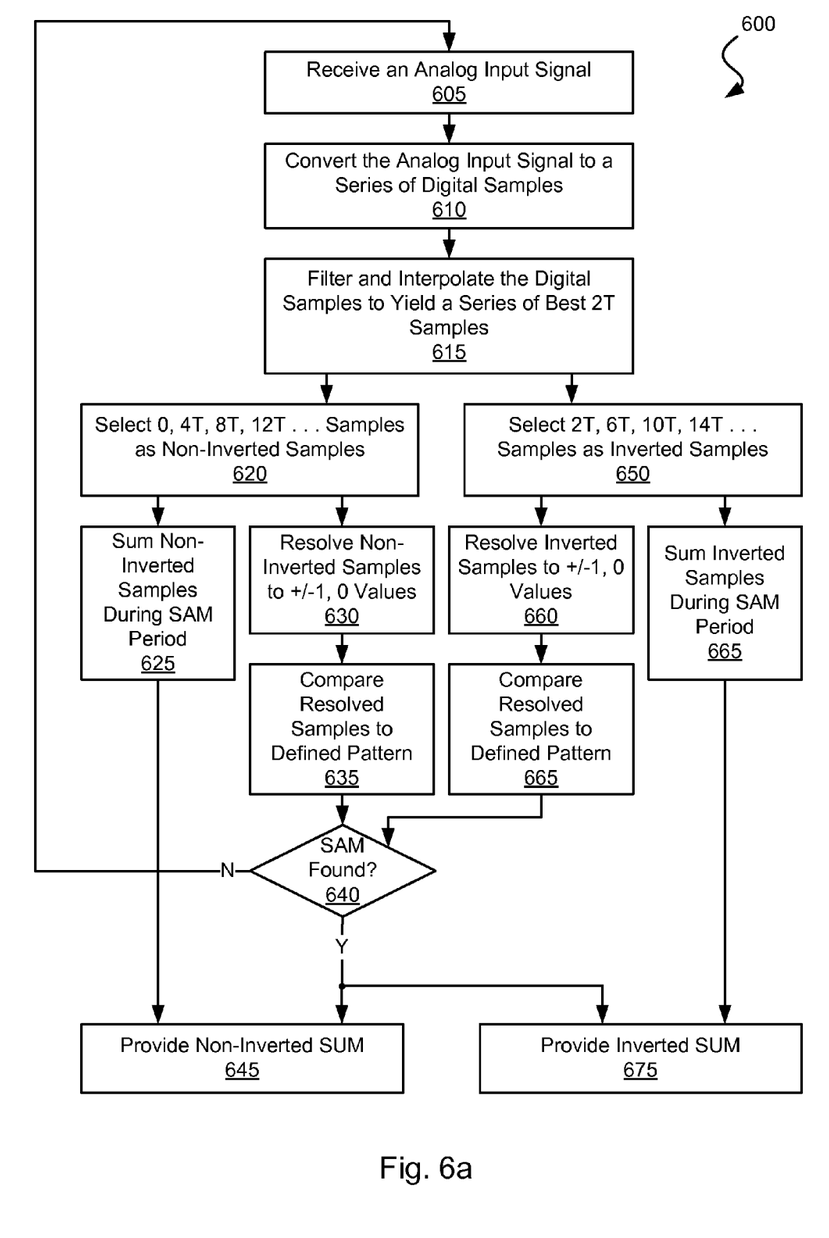
FIGS. 6a-6b are flow diagrams indicating phase shift based data inversion detection processing in accordance with various embodiments of the present invention.
Figure 6B:
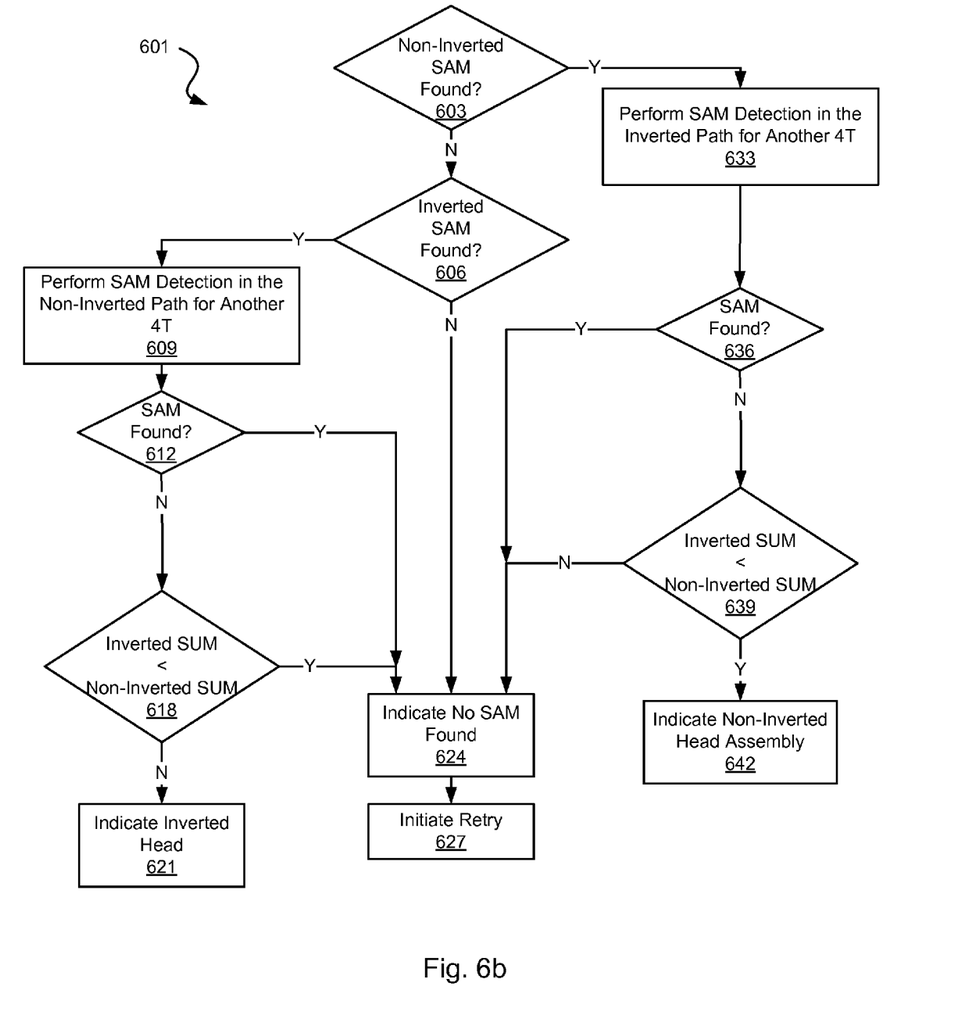

Turning to FIGS. 6a-6b, a flow diagram 600 and a flow diagram 601 depict a method for phase shift based data inversion detection processing in accordance with various embodiments of the present invention. Following flow diagram 600, an analog input is received (block 605). The analog input may be derived from a variety of sources including, but not limited to, a storage medium or a receiver. Based upon the disclosure provided herein, one of ordinary skill in the art will recognize a variety of sources of the analog input. An analog to digital conversion is performed to convert the analog input into a series of digital samples (block 610). The analog to digital conversion may be done using any analog to digital conversion approach known in the art. The digital samples are filtered and interpolated to yield a series of the best possible 2T samples (block 615). The best samples occur where either the 0T, 4T, 8T . . . or the 2T, 6T, 10T . . . samples correspond to the approximate maximums and minimums of the analog input signal.

The 0T, 4T, 8T . . . samples are selected as the non-inverted samples (block 620), and the 2T, 6T, 10T . . . samples are selected as the inverted samples (block 650). The inverted samples are resolved to +1, 0 and −1 values depending upon the sign and magnitude of the respective samples (block 660). In one embodiment, an inverted sample value that is greater than zero is resolved as a +1, an inverted sample value that is exactly zero is resolved as a 0, and an inverted sample value that is less than zero is resolved as a −1. A defined number of the most recent resolved, inverted samples are compared against a defined pattern (i.e., the sector address mark pattern) (block 665). The defined number corresponds to the number of bits in the sector address mark pattern. Similarly, the non-inverted samples are resolved to +1, 0 and −1 values depending upon the sign and magnitude of the respective samples (block 630). In one embodiment, an inverted sample value that is greater than zero is resolved as a +1, an inverted sample value that is exactly zero is resolved as a 0, and an inverted sample value that is less than zero is resolved as a −1. The defined number of the most recent resolved, non-inverted samples are compared against a defined pattern (i.e., the sector address mark pattern) (block 635).

At the same time, the absolute value of each of the defined number of the most recent inverted samples are summed to yield an inverted sum (block 665), and the absolute value of each of the defined number of the most recent non-inverted samples are summed to yield a non-inverted sum (block 625). It is determined whether either the defined number of the most recent resolved It is then determined whether a sector address mark was identified in either the most recent resolved, non-inverted samples of the most recent resolved, inverted samples (block 640). Where a sector address mark is identified in either the non-inverted samples or the inverted samples (block 640), the non-inverted sum and the inverted sum are provided for use in determining inversion of the head assembly as more fully discussed in relation to flow diagram 601 (blocks 645, 675). As an example, where the sector address mark is twenty bit periods in length, an absolute value of each of the twenty non-inverted samples corresponding to the twenty bit periods where the sector address mark was identified are summed together to yield the non-inverted sum, and an absolute value of each of the twenty inverted samples corresponding to the twenty bit periods where the sector address mark was identified are summed together to yield the inverted sum.

Following flow diagram 601, it is determined whether the sector address mark was found in the non-inverted samples (block 603). Where the sector address mark was found in the non-inverted samples (block 603), one more bit period of the inverted samples are incorporated with other recently received inverted samples and compared with the defined pattern (e.g., using the processes of blocks 660, 665) (block 633). Based on this comparison, it is determined whether a sector address mark was also found in the inverted samples (block 636). Finding a sector address mark in both the non-inverted samples and the inverted samples is considered an error condition, so an indication that no sector address mark was found is provided (block 624), and a retry is initiated (block 627). Initiating a retry involves continued processing of samples as they are received in accordance with the methods of flow diagram 600 and flow diagram 601. Alternatively, where a sector address mark is not found in the inverted samples (block 636), the inverted sum is compared with the non-inverted sum (block 639). Where the inverted sum is less than the non-inverted sum (block 639) an indication that the head assembly is inverted is issued (block 642). Otherwise, the sector address mark identified in the non-inverted samples is considered spurious, an indication that no sector address mark was found is provided (block 624), and a retry is initiated (block 627).

Where the sector address mark was not found in the non-inverted samples (block 603), it is determined whether the sector address mark was found in the inverted samples (block 606). If this condition is not true, an error occurred in indicating the identification of the sector address mark in either the most recent resolved, non-inverted samples of the most recent resolved, inverted samples that was done in block 640. In such a case, an indication that no sector address mark was found is provided (block 624), and a retry is initiated (block 627).

Otherwise, where the sector address mark was found in the inverted samples (block 606), one more bit period of the non-inverted samples are incorporated with other recently received non-inverted samples and compared with the defined pattern (e.g., using the processes of blocks 630, 635) (block 609). Based on this comparison, it is determined whether a sector address mark was also found in the inverted samples (block 612). Finding a sector address mark in both the non-inverted samples and the inverted samples is considered an error condition, so an indication that no sector address mark was found is provided (block 624), and a retry is initiated (block 627). Alternatively, where a sector address mark is not found in the non-inverted samples (block 612), the inverted sum is compared with the non-inverted sum (block 618). Where the inverted sum is not less than the non-inverted sum (block 618) an indication that the head assembly is non-inverted is issued (block 621). Otherwise, the sector address mark identified in the non-inverted samples is considered spurious, an indication that no sector address mark was found is provided (block 624), and a retry is initiated (block 627).

Of note, the processes discussed in relation to flow diagrams 600, 601 may be done once, or may be repeated several times until confidence is achieved in a resulting indication of either a non-inverted head assembly or an inverted head assembly. The resulting indication of the polarity of the head assembly may then be used to modify how the circuit operates to process data by either inverting the data input, or using the data input as is.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for performing data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for determining a signal polarity in a data processing system, the method comprising:
   receiving a series of data samples corresponding to an analog input, wherein a first subset of the data samples corresponds to a first sample phase of the analog input and a second subset of the data samples corresponds to a second sample phase of the analog input;
   resolving the first subset of data samples to a first set of binary values representing the first subset of data samples and comparing the first set of binary values to a defined pattern, wherein the defined pattern is identified in the first subset of the data samples;
   summing an absolute value of each sample of the first subset of the data samples to yield a first sum;
   resolving the second subset of the data samples to a second set of binary values representing the second subset of data samples and comparing the second set of binary values to the defined pattern;
   summing an absolute value of each sample of the second subset of the data samples to yield a second sum; and
   determining a signal polarity based at least in part on a difference between the first sum and the second sum.

2. The method of claim 1, wherein the first sample phase is approximately one hundred eighty degrees away from the second sample phase.

3. The method of claim 1, wherein the first subset of the data samples includes inverted data samples, and wherein determining the signal polarity based at least in part on a difference between the first sum and the second sum includes:
   comparing the first sum with the second sum, wherein the first sum is greater than the second sum; and
   indicating an inverted signal polarity based at least in part on the identified defined pattern and the first sum being greater than the second sum.

4. The method of claim 1, wherein the first subset of the data samples includes non-inverted data samples, and wherein determining the signal polarity based at least in part on a difference between the first sum and the second sum includes:
   comparing the first sum with the second sum, wherein the first sum is greater than the second sum; and
   indicating a non-inverted signal polarity based at least in part on the identified defined pattern and the first sum being greater than the second sum.

5. The method of claim 1, wherein the defined pattern is a sector address mark pattern.

6. The method of claim 1, wherein resolving the first subset of the digital samples to binary bit values includes:
   setting a binary bit value to a +1 when the corresponding digital sample is greater than zero; and
   setting a binary bit value to a −1 when the corresponding digital sample is less than zero.

7. The method of claim 1, wherein determining the signal polarity based at least in part on a difference between the first sum and the second sum includes:
   comparing the first sum with the second sum, wherein the first sum is less than the second sum; and
   maintaining a previous head polarity.

8. The method of claim 1, wherein performing the defined pattern detection on the second subset of the data samples results in identification of the defined pattern in the second subset of the data samples, and wherein the method further comprises:
   maintaining a previous head polarity.

9. A head polarity detection circuit, the circuit comprising:
   a first computation circuit operable to sum an absolute value of each sample of a first subset of a series of data samples corresponding to a first phase of an analog input to yield a first sum;
   a first pattern detection circuit operable to resolve the first subset of the series of data samples to a first set of binary values representing the first subset of the series of data samples and comparing the first set of binary values to a defined pattern, wherein the defined pattern is identified in the first subset of the series of data samples;
   a second computation circuit operable to sum an absolute value of each sample of a second subset of the series of data samples corresponding to a second phase of the analog input to yield a second sum, wherein the first phase is more than ninety degrees offset from the second phase;
   a second pattern detection circuit operable to resolve the second subset of the series of data samples to a second set of binary values representing the second subset of the series of data samples and comparing the second set of binary values to the defined pattern, wherein the defined pattern is identified in the second subset of the series of data samples; and
   an inversion determination circuit operable to determine a signal polarity based at least in part on a difference between the first sum and the second sum.

10. The circuit of claim 9, wherein the circuit further comprises:
    a sample buffer circuit operable to maintain the first subset of the series data samples and the second subset of the data samples.

11. The circuit of claim 9, wherein the defined pattern is a sector address mark pattern.

12. The circuit of claim 9, wherein the first subset of the series data samples includes inverted data samples, and wherein determining the signal polarity based at least in part on a difference between the first sum and the second sum includes:
   comparing the first sum with the second sum, wherein the first sum is greater than the second sum; and
   indicating an inverted signal polarity based at least in part on the identified defined pattern and the first sum being greater than the second sum.

13. The circuit of claim 9, wherein the first subset of the series of data samples includes non-inverted data samples, and wherein determining the signal polarity at least in part on a difference between the first sum and the second sum includes:
   comparing the first sum with the second sum, wherein the first sum is greater than the second sum; and
   indicating a non-inverted signal polarity based at least in part on the identified defined pattern and the first sum being greater than the second sum.

14. The circuit of claim 9, wherein the first phase is approximately one hundred eighty degrees away from the second sample phase.

15. The circuit of claim 9, wherein the circuit is implemented as part of an integrated circuit.

16. The circuit of claim 9, wherein the circuit is implemented as part of a storage device.

17. A storage device, the storage device comprising:
   a storage medium;
   a head assembly disposed in relation to the storage medium and operable to generate an analog input corresponding to information on the storage medium;
   a head polarity determination circuit including:
      a first computation circuit operable to sum an absolute value of each sample of a first subset of a series of data samples corresponding to a first phase of the analog input to yield a first sum;
      a first pattern detection circuit operable to resolve the first subset of the series of data samples to a first set of binary values representing the first subset of the series of data samples and comparing the first set of binary values to a defined pattern, wherein the defined pattern is identified in the first subset of the series of data samples;
      a second computation circuit operable to sum an absolute value of each sample of a second subset of the series of data samples corresponding to a second phase of the analog input to yield a second sum, wherein the first phase is more than ninety degrees offset from the second phase;
      a second pattern detection circuit operable to resolve the second subset of the series of data samples to a second set of binary values representing the second subset of the series of data samples and comparing the second set of binary values to a defined pattern; and
      an inversion determination circuit operable to determine a polarity of the head assembly based at least in part on a difference between the first sum and the second sum.

18. The storage device of claim 17, wherein the first subset of the data samples are inverted data samples, and wherein determining a head polarity at least in part on a difference between the first sum and the second sum includes:
   comparing the first sum with the second sum, wherein the first sum is greater than the second sum; and
   indicating an inverted polarity of the head assembly based at least in part on the identified defined pattern and the first sum being greater than the second sum.

19. The storage device of claim 17, wherein the first subset of the data samples are non-inverted data samples, and wherein determining a head polarity at least in part on a difference between the first sum and the second sum includes:
   comparing the first sum with the second sum, wherein the first sum is greater than the second sum; and
   indicating a non-inverted polarity of the head assembly based at least in part on the identified defined pattern and the first sum being greater than the second sum.

20. The storage device of claim 17, wherein the storage device further comprises:
   a sample buffer circuit operable to maintain the first subset of the series of data samples and the second subset of the data samples.

21. The storage device of claim 17, wherein the defined pattern is a sector address mark pattern.

* * * * *